(No Model.)

J. H. FERGUSON.
DUMPING WAGON.

No. 333,844.   Patented Jan. 5, 1886.

Attest:
John Schuman.

Inventor:
Judah H. Ferguson.
by his Atty

UNITED STATES PATENT OFFICE.

JUDAH H. FERGUSON, OF RATTLE RUN, MICHIGAN.

DUMPING-WAGON.

SPECIFICATION forming part of Letters Patent No. 333,844, dated January 5, 1886.

Application filed October 15, 1885. Serial No. 179,952. (No model.)

*To all whom it may concern:*

Be it known that I, JUDAH H. FERGUSON, of Rattle Run, in the county of St. Clair and State of Michigan, have invented new and useful Improvements in Dumping-Wagons; and I do hereby declare that the following is a full, clear, and exact description thereof, reference being had to the accompanying drawings, which form a part of this specification.

This invention relates to certain new and novel improvements in farm-wagons of that class that are especially adapted for dumping a load without the necessity of removing the side-boards of the box; and the invention consists in the peculiar construction, arrangement, and combination of the various parts, all as more fully hereinafter set forth.

Figure 1:
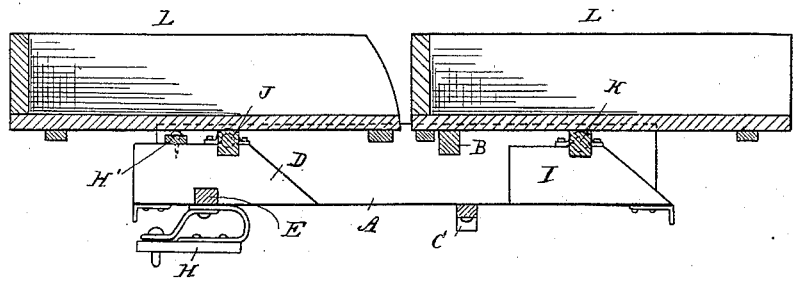
Figure 2:
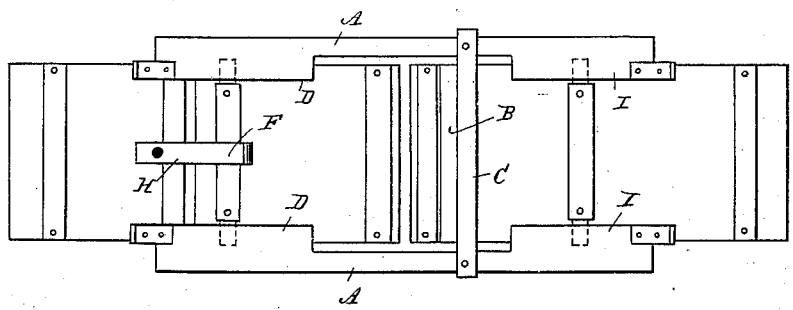
Figure 3:
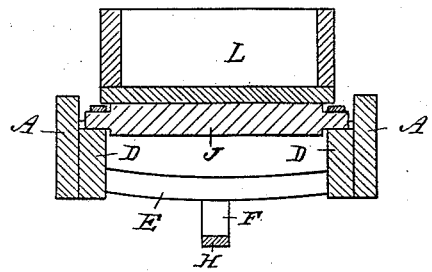

Figure 1 is a vertical longitudinal section of my improved wagon-box. Fig. 2 is a bottom plan. Fig. 3 is a cross-section on the line $x$ $x$, Fig. 2.

In the accompanying drawings, which form a part of this specification, A represents side rails of a supporting-frame connected together by a girt, B. Below this girt B, and secured to the lower edges of the side rails, is a bolster, C, designed to be supported by the rear wheels of the running-gear. (Not shown.) To the forward ends of the side rails, and to the inner faces thereof, are rigidly secured the bearing-blocks D, the same being connected together by a bar, E, to the longitudinal center of which is pivotally secured a suitable hanger, F, to which is in turn secured the short reach-bar, H, the forward end of the latter being designed to be attached or connected to the front running-gear of the wagon, the latter not being shown, as it forms no part of my invention. The tops of these bearing-bars E are secured together by a spreader-bar, H'. The rear or inner ends of the bearing-blocks D are beveled off, as shown, to serve as stops or rests for the box when it is tilted, as hereinafter described.

I represents similar bearing-blocks, which are secured to the inner rear faces of the side rails, and in the upper edges of these bearing-blocks D and I proper bearings are formed in which rest the rock-shafts J K, respectively, to each of which is rigidly secured a box, L, the rear ends of which are open, and these boxes are so secured that they will remain in a horizontal position, the forward end of the front box resting upon a spreader-bar, H', while the corresponding end of the rear box rests upon the girt B.

A wagon constructed substantially as described is of great use for farm working, especially so in distributing barn-yard fertilizer, which, in the old way, is dumped upon the field in the desired spots by removing one of the side-boards and raking or shoveling off the desired quantity, while with a device of this kind when it is desired to dump one box is dumped at a time, without necessarily stopping the team, by merely tipping up the front end of either one of the boxes until the other end has passed the center of gravity, when the load will slide out at the open end, and in dumping the front box it will be observed that there is no obstruction in the way in the shape of a reach or cross-bar that will prevent a free discharge of the load.

While I have shown but two boxes, it is evident that three or more can be used without departing from the spirit of my invention.

What I claim as my invention is—

1. The combination, with the side rails, of the bearing-blocks D I, secured to the inner faces of said rails, the rock-shafts J K, journaled in bearings in said blocks, and the boxes L, rigidly secured to said rock-shafts, substantially as described.

2. The combination, with the side rails, of the bearing-blocks D I, secured thereto and having their rear ends beveled, the rock-shafts journaled in bearings in said blocks, and the boxes L, rigidly secured to said rock-shafts, substantially as and for the purpose specified.

3. In a farm-wagon, the combination of the side rails, A', bolster C, bearing-blocks D I, bar E, hanger F, reach-bar H, rock-shafts J K, and boxes L, all constructed, arranged, and operating substantially in the manner and for the purposes set forth.

In testimony that I claim the above as my invention I hereunto affix my signature this 19th day of September, 1885.

JUDAH H. FERGUSON.

Witnesses:
 H. S. SPRAGUE,
 E. SCULLY.